United States Patent [19]

Kitahara et al.

[11] 3,927,940
[45] Dec. 23, 1975

[54] MANUSCRIPT SCANNING DEVICE FOR COPYING MACHINES AND THE LIKE

[75] Inventors: Hitoshi Kitahara, Yamato; Jack C. Pei, Machida, both of Japan

[73] Assignee: Fuji Xerox Co., Ltd., Tokyo, Japan

[22] Filed: Jan. 17, 1974

[21] Appl. No.: 434,104

[30] Foreign Application Priority Data
Jan. 24, 1973 Japan................................. 48-9465

[52] U.S. Cl. ...................... 355/66; 350/7; 350/285; 352/108; 355/8; 355/47
[51] Int. Cl.²......................................... G03B 27/70
[58] Field of Search ............. 350/7, 285; 355/8, 47, 355/65, 66; 176/5.4 ES, 7.4, 7.6, DIG. 27; 352/84, 106, 108, 109, 111, 112

[56] References Cited
UNITED STATES PATENTS

| | | | |
|---|---|---|---|
| 1,825,953 | 10/1931 | Hallongren ......................... | 352/105 |
| 1,994,708 | 3/1935 | Hogan.................................. | 178/7.6 |
| 3,049,049 | 8/1962 | Katona................................ | 350/7 X |
| 3,142,224 | 7/1964 | Andrews et al..................... | 350/7 X |
| 3,576,368 | 4/1971 | Goetz et al. ........................ | 350/7 X |
| 3,775,619 | 11/1973 | De Jong.............................. | 350/7 X |

Primary Examiner—Joseph F. Peters, Jr.
Assistant Examiner—Kenneth C. Hutchison
Attorney, Agent, or Firm—Gerald J. Ferguson, Jr.; Joseph J. Baker

[57] ABSTRACT

In a scanning device for a copying machine and the like including a light source for illuminating an original document, a photosensitive material driven at a predetermined speed, and reflecting means for directing light from the original document towards the photosensitive material, the improvement comprising the reflecting means including a plurality of reflectors radially disposed about a predetermined axis for scanning the original document by progressively directing the light from the original document towards the photosensitive material, each reflector including a non-reflecting portion extending from approximately the predetermined axis along the reflector, the length of each of the non-reflecting portions being such as to prevent reflections from its associated reflector onto the reflector in front of it, and driving means for driving the reflecting means in one direction so that the reflectors successively scan the original document.

1 Claim, 1 Drawing Figure

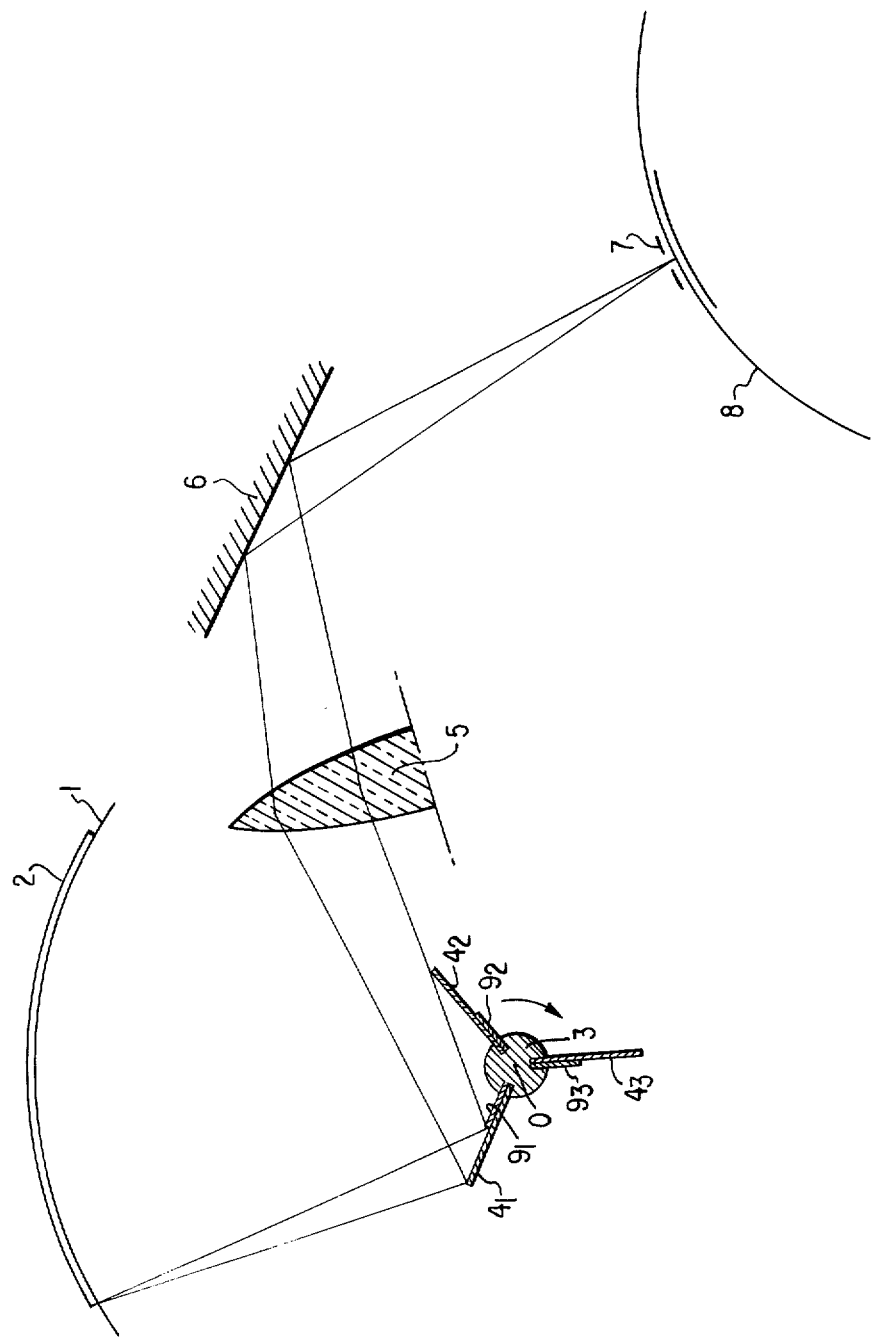

MANUSCRIPT SCANNING DEVICE FOR COPYING MACHINES AND THE LIKE

CROSS-REFERENCE TO RELATED APPLICATIONS

This application is related to copending United States applications entitled "Plural Reflector, Single Speed, Uni-directional Scanning Device for Use in Copying Machines and the Like," Ser. No. 434,182, filed by Hitoshi Kitahara and Jack Pei on Jan. 17, 1974, and "Uni-directional Scanning Device for Use in Copying Machines and the Like," Ser. No. 417,195, filed by Jack Pei on Nov. 19, 1973, and now abandoned both of which are incorporated herein by reference.

BACKGROUND OF THE INVENTION

1. Field of the Invention

This invention relates to an improved manuscript scanning and exposing device for copying machines, and specifically to a manuscript scanning and exposing device in which a stationary manuscript is scanned by a rotating reflector.

2. Discussion of the Prior Art

In typical manuscript scanning and exposing devices, the reflector is usually oscillated back and forth so that the document is scanned during the forward path of the reflector, the region near the oscillating center line being used as a reflection surface. To increase the scanning speed, it is necessary to increase the return path speed with respect to the forward path speed. But the quick return motion and subsequent re-direction of motion generates vibrations in the mechanism, thus imposing a limitation on the scanning speed. In addition, use of a surface of reflection near the oscillating shaft makes it impossible to employ a plurality of reflectors.

Other objects and advantages of this invention will become apparent upon reading the appended claims in conjunction with the following detailed description and the attached drawing.

SUMMARY OF THE INVENTION

A primary object of this invention is to provide a scanning and exposing device capable of (1) minimizing vibration due to reflector motion and (2) continuous scanning of a stationary original at a resultant high rate of copy speed with a plurality of reflectors.

BRIEF DESCRIPTION OF THE DRAWING

The sole FIGURE of the drawing is a schematic diagram of a preferred, illustrative embodiment of the invention.

DETAILED DESCRIPTION OF PREFERRED EMBODIMENT

A plate 1 holds a manuscript 2 in an arcuate shape with a point 0 as a center. A rotary shaft 3 rotates about point 0. Radially disposed around shaft 3 are three protruding reflectors $4_1$, $4_2$ and $4_3$, each separated by an angle of 120° from the other reflectors. A lens system 5, a fixed mirror 6, a slit 7, and a photosensitive body 8 such as a selenium drum used in electronic photography are employed as indicated. Individual mirrors $4_1$, $4_2$, and $4_3$ have non-reflecting surfaces $9_1$, $9_2$ and $9_3$. As can be seen in the figure, the length of each of the surfaces $9_1$, $9_2$, and $9_3$ is such as to prevent reflection onto the reflector in front of it. Thus, the length of surface $9_1$ is such that reflections onto the back of reflector $4_2$ are prevented. (As indicated in the figure, the reflections from each reflector completely bypass the reflector in front of it).

Thus, since each reflector does not use the region near the shaft 3 for scanning, it is possible to employ a plurality of reflectors. Furthermore, in place of the conventional oscillating motion, the scanning motion according to this invention is based upon rotation at a constant speed in a predetermined direction thereby eliminating undesired vibrations and allowing the resultant copy speed to be greatly increased. This also provides a simplified mechanism which is easy to manufacture at reduced cost.

The number of mirrors and optical systems employed in this invention, of course, is not limited to those shown in the above embodiment, but may be modified appropriately.

Numerous modifications of the invention will become apparent to one of ordinary skill in the art upon reading the foregoing disclosure. During such a reading it will be evident that this invention provides a unique manuscript scanning device for accomplishing the objects and advantages hereinstated.

1. A scanning device for a copying machine and the like, said copying machine copying an original document and including a photosensitive material driven at a predetermined speed, said scanning device comprising means for maintaining said original document stationary;

a light source for illuminating said stationary original document;

reflecting means for directing light from said stationary original document towards the photosensitive material;

a rotatable shaft having a predetermined axis;

said reflecting means including three reflectors radially mounted at equal angular intervals on said rotatable shaft for scanning the original document by progressively directing the light from the original document towards the photosensitive material, each said reflector being fixedly mounted on said rotatable shaft and extending therefrom along an outwardly directed radial, each said reflector being covered on its reflecting side by a non-reflecting portion extending from said rotatable shaft along said reflector, the length of each of said non-reflecting portions being such as to prevent reflections from its associated reflector onto the reflector in front of it;

driving means for driving said rotatable shaft in one direction so that said reflectors successively scan the original document; and means for mounting said document and reflectors with respect to one another so that a light ray from any predetermined point on the stationary original document is incident to and reflected from said reflectors in a plane which is substantially perpendicular to said predetermined axis of the shaft.

* * * * *